United States Patent
Palumbo, Jr.

(10) Patent No.: US 11,691,660 B2
(45) Date of Patent: Jul. 4, 2023

(54) STAIR CLIMBER FOR CASKETS

(71) Applicant: Samuel S. Palumbo, Jr., Elmwood Park, IL (US)

(72) Inventor: Samuel S. Palumbo, Jr., Elmwood Park, IL (US)

(73) Assignee: Samuel S. Palumbo, Elmwood Park, IL (US)

( * ) Notice: Subject to any disclaimer, the term of this patent is extended or adjusted under 35 U.S.C. 154(b) by 18 days.

(21) Appl. No.: 17/335,695

(22) Filed: Jun. 1, 2021

(65) Prior Publication Data

US 2021/0380154 A1 Dec. 9, 2021

Related U.S. Application Data

(60) Provisional application No. 63/034,658, filed on Jun. 4, 2020.

(51) Int. Cl.
 *B62B 5/02* (2006.01)
 *B62B 3/02* (2006.01)
 *A61G 21/00* (2006.01)

(52) U.S. Cl.
 CPC .............. *B62B 5/02* (2013.01); *A61G 21/00* (2013.01); *B62B 3/02* (2013.01)

(58) Field of Classification Search
 CPC .............. B62B 3/02; B62B 5/02; A61G 21/00
 USPC ........................................................ 280/639
 See application file for complete search history.

(56) References Cited

U.S. PATENT DOCUMENTS

| | | |
|---|---|---|
| 3,208,544 A | 9/1965 | Colvin |
| 3,348,518 A | 10/1967 | Forsyth et al. |
| 3,450,219 A | 6/1969 | Fleming |
| 3,580,344 A | 5/1971 | Floyd |
| 4,687,213 A * | 8/1987 | Ridderstolpe ........ B62D 57/022 280/5.26 |
| 4,709,772 A | 12/1987 | Brunet |
| 5,273,296 A | 12/1993 | Lepek |

(Continued)

FOREIGN PATENT DOCUMENTS

| | | |
|---|---|---|
| CN | 1718489 A | 1/2006 |
| CN | 103963814 A | 8/2014 |

(Continued)

OTHER PUBLICATIONS

Translation of JP2010264970A accessed from www.espacenet.com on Jul. 30, 2022. (Year: 2010).*

(Continued)

*Primary Examiner* — James A Shriver, II
*Assistant Examiner* — Hilary L Johns
(74) *Attorney, Agent, or Firm* — Vedder Price P.C.

(57) ABSTRACT

A modular and lightweight Stair Climber for Caskets is provided. The Stair Climber for Caskets is uniquely designed and configured with a trolley frame and four sets of wheels arranged and affixed at the four ends of the trolley frame respectively. In the depicted embodiment, each set of wheels comprises three wheels spaced an equal distance from each other that rotate together about a horizontal axis for easy navigation. The Stair Climber for Caskets further comprises wheel plates attached to the set of wheels. The Stair Climber for Caskets is designed ergonomically with the right configuration for ensuring easy movement up and down stairs of different heights and inclinations.

20 Claims, 17 Drawing Sheets

(56) References Cited

U.S. PATENT DOCUMENTS

| | | | | |
|---|---|---|---|---|
| 6,336,642 B1* | 1/2002 | Carstens | ................... | B62B 5/02 |
| | | | | 280/5.24 |
| D590,120 S | 4/2009 | Thompson | | |
| D827,969 S | 9/2018 | Khubani | | |
| 10,513,284 B2* | 12/2019 | Gerhardt | ................. | B62J 45/41 |
| 2013/0184917 A1* | 7/2013 | Sarokhan | ............. | B62B 5/0026 |
| | | | | 180/7.1 |
| 2013/0231814 A1* | 9/2013 | Sarokhan | ................... | B25J 5/00 |
| | | | | 180/7.1 |
| 2015/0196439 A1* | 7/2015 | Osipov | ................ | B62B 5/0033 |
| | | | | 180/19.1 |
| 2019/0039635 A1 | 2/2019 | Khubani | | |
| 2019/0322302 A1* | 10/2019 | Greenup | ................... | B62B 3/02 |
| 2020/0198681 A1* | 6/2020 | Jian | ........................... | B62B 5/02 |

FOREIGN PATENT DOCUMENTS

| | | | | |
|---|---|---|---|---|
| CN | 204250123 U | 4/2015 | | |
| CN | 108791450 A | 11/2018 | | |
| CN | 110116744 A | 8/2019 | | |
| DE | 202007015278 U1 | 2/2008 | | |
| JP | 2010-0264970 A | 11/2010 | | |
| JP | 2010264970 A * | 11/2010 | ........... | A45C 13/385 |
| KR | 101712728 B1 * | 4/2015 | .............. | B62B 5/02 |
| KR | 10-1712728 B1 | 3/2017 | | |
| KR | 10-2017-0075465 A | 7/2017 | | |

OTHER PUBLICATIONS

Translation of KR101712728B1 accessed from www.espacenet.com on Jul. 30, 2022. (Year: 2015).*
International Search Report and Written Opinion filed in PCT/US2021/035189 dated Sep. 24, 2021; 10 pgs.

* cited by examiner

| ITEM | QTY | PART NUMBER | DESCRIPTION |
|---|---|---|---|
| 1 | 4 | 1 | L2" X 2" X 1/8" 48" |
| 2 | 5 | 3 | 1-3/4" X 1-3/4" X 1/8" X 8" |
| 3 | 2 | C | 2" X 6" X 1/8" X 6" |
| 4 | 4 | F | 3-1/2" X 18-3/4" X 1/4" |
| 5 | 4 | E | 3-1/2" X 20-3/4" X 1/4" |
| 6 | 4 | 2 | 2" X 3" X 1/4" X 4-1/4" |
| 7 | 8 | WHEEL PLATE | 7-1/2" X 7-1/2" X 1/4" |
| 8 | 4 | 4 | 3/4" X 3/4" X 1/8" X 24" |
| 9 | 4 | B | 1-3/4" X 1-3/4" X 1/4" X 13-7/8" |
| 10 | 2 | 6 | 1-3/4" X 1-1/2" X 3/4" |
| 11 | 4 | 8 | 2" X 2" X 1/8" |
| 12 | 2 | 1528A240_STRAP HINGE-1 | 1528A240_STRAP HINGE |
| 13 | 12 | 6649K130_HARDENED PRECISION STEEL SHAFT-2-375 LG | HARDENED PRECISION STEEL SHAFT |
| 14 | 12 | 2322T16 | |
| 15 | 2 | FHA | 1" DIA X 1/4" X 8" |
| 16 | 2 | FHB | 1" DIA X 1/4" X 6" |
| 17 | 2 | RHA | 1" DIA X 1/4" X 10" |
| 18 | 2 | RHB | 1" DIA X 1/4" X 6" |
| 19 | 2 | H | 1-1/2" X 2/1/2" X 1/8" |
| 20 | 2 | G | 1" DIA X 1/4" X 22-1/4" |
| 21 | 2 | A | 2" X 3" X 1/4" X 4-1/4" |
| 22 | 2 | 98320A145 | QUICK-RELEASE PIN |

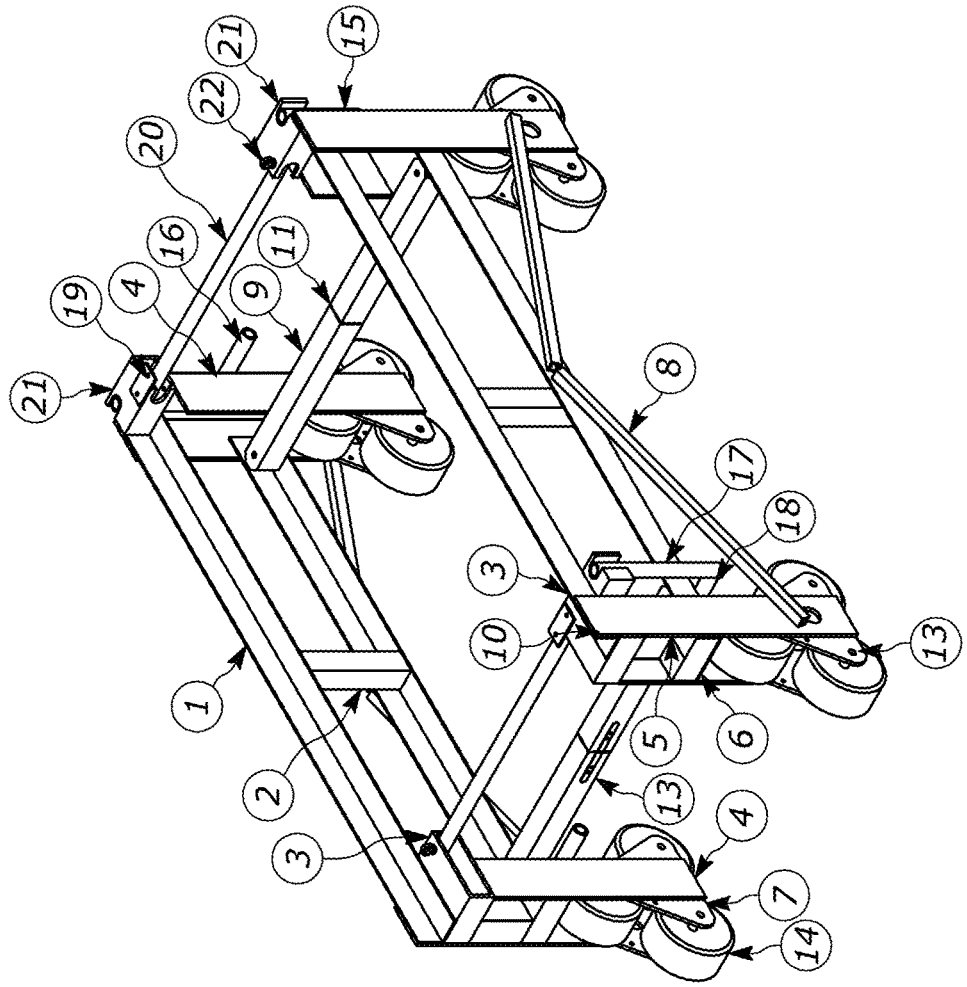

FIG. 9

STAIR CLIMBER FOR CASKETS

This application claims the benefit of and priority to U.S. Provisional Application No. 63/034,658, filed Jun. 4, 2020, the content of which is hereby incorporated by reference.

FIELD OF THE INVENTION

The present invention is generally related to the field of funeral and burial devices and, more particularly, a device/carrier for transporting and/or maneuvering a casket. More particularly, the present invention is directed to a Stair (or step) Climber for Caskets comprising a novel and unique configuration of wheels for easy navigation and transporting and/or maneuvering a casket.

BACKGROUND

A funeral is both a solemn event and a ceremony for celebrating, respecting, sanctifying or remembering the life of a person who has died. Caskets are an integral part of funerals as they are commonly used to carry and/or inter the remains of the deceased. Extreme care must be taken when transporting remains of the deceased in a casket.

The market for Casket Carriers provides a variety of options for carriers used to carry and/or inter the remains of the deceased. However, such Casket Carriers are not necessarily relatively thin, light and portable or easily configurable for transporting and/or maneuvering a casket—especially transporting and/or maneuvering a casket up and down stairs. More specifically, such Casket Carriers typically have a predefined length and width embedded in a solid/rigid frame designed to function primarily as mortuary trolleys or transport/loading devices without any consideration given to, the ease of navigation and transporting and/or maneuvering a casket. Such scarcity of options is more prevalent when it comes to lightweight and portable Casket Carriers for easy transporting and/or maneuvering a casket up and down stairs.

The challenges are magnified when carrying these caskets across varied terrains or stairs, or for moving up and down stairs of different heights and inclinations. There is a market need for a Stair Climber for Caskets comprising a novel and unique configuration of wheels that can be easily configured for transporting and/or maneuvering a casket up and down stairs of different heights and inclinations. The present invention addresses such a long-felt but unresolved need in the field of funeral and burial devices and, more particularly, the need for a device/carrier that can be easily configured for transporting and/or maneuvering a casket up and down stairs.

The present invention further solves the problems and overcomes the drawbacks and deficiencies of prior art Casket Carriers by providing an easy-to-navigate Stair Climber for Caskets which is simple in operation, yet robust in design, so as to require minimal maintenance for adequate and continued operation and ensuring easy movement up and down stairs of different heights and inclinations.

SUMMARY

The apparatus and related methods described in the present invention address the drawbacks of existing designs for Casket Carriers.

An objective of the present invention is to provide a Stair Climber for Caskets comprising a novel, unique and easy means of transporting and/or maneuvering a casket up and down the stairs of different heights and inclinations. More specifically, a Stair Climber for Caskets is provided with uniquely configured frame bars, handle bars and similar attached elements and trusses.

The Stair Climber for Caskets further comprises a wheel mechanism for transporting and/or maneuvering means and a folding mechanism thereby reducing weight and increasing durability during transporting a casket (without ever picking up the full weight of the casket) up and down stairs of different heights and inclinations.

Embodiments disclosed in the present application provide such a Stair Climber for Caskets that may be used for easy navigating and transporting and/or maneuvering a casket (as shown in FIG. 5).

In an embodiment, a Stair Climber for Caskets is provided in a collapsible/folded state, wherein the Stair Climber for Caskets can be easily transported and/or maneuvered by one person for a considerable distance.

In the depicted embodiment, the collapsible/foldable Casket Carrier is strong and rigid when extended, and well adapted to hold considerable weight, in a manner to obviate the possibility of the carrier being broken or the casket contents supported thereby being dismounted or falling therefrom while moving up and down stairs of different heights and inclinations (as shown in FIG. 1).

In another embodiment, a Stair Climber for Caskets comprises a trolley frame and four sets of wheels arranged and affixed at the four ends of the trolley frame respectively.

In the above depicted embodiment, each set of wheels further comprises three wheels spaced an equal distance from each other that rotate together about a horizontal axis for easy navigation and moving the casket up and down stairs of different heights and inclinations. By way of example and not limitation, the rotary bearing attached via the triangular-shaped wheel plate is arranged between the wheel sets and the frame for them to rotate together about a horizontal axis for easy navigating and transporting and/or maneuvering a casket easily up and down stairs of different heights and inclinations.

In another embodiment, the unique and novel arrangement of the set of wheels comprising three wheels spaced an equal distance from each other and rotating together about a horizontal axis for easy navigating, transporting and/or maneuvering a casket is shown. By way of example and not limitation, the wheels are configured to attach to triangular-shaped wheel plates for improved rotation along a single axis and easy transportation and navigation.

In yet another embodiment, a Stair Climber for Caskets is configured with a unique wheel mechanism comprising at least four sets of three wheels spaced equidistant at a predetermined length from each other and attached to the trolley frame. By way of example and not limitation, in the above-depicted embodiment, the equidistant three-wheel configuration can have different designs and configurations.

In an embodiment, the materials used in designing a Stair Climber for Caskets are shown in FIG. 9.

In another embodiment, as illustrated above, the Stair Climber for Caskets comprises various elements designed with certain materials for easy navigating, transporting and/or maneuvering a casket for use with stairs of different heights and inclinations.

In the depicted embodiment, the Stair Climber for Caskets is designed ergonomically with the right configuration for ensuring easy movement up and down stairs of different heights and inclinations. In general, the total or gross weight of a trolley (weight of trolley plus load weight) determines the force required to move the trolley. The greater the total weight, the greater the force to move it. However, the novel Stair Climber for Caskets is designed and configured to ensure that the total or gross weight of the Stair Climber (weight of the Stair Climber plus load weight of the Casket) never exceeds a certain limit. In other words, using the Stair Climber for Caskets always results in (1) less weight when pushing the casket up the stairs and (2) less weight when pushing the casket down the stairs—irrespective of the total or gross weight of the Stair Climber. By way of example and not limitation, the novelty of the Stair Climber for Caskets allows a person to move the casket up and down the stairs without actually picking up the entire weight of the casket.

In the depicted embodiment, the wheel plates can be manufactured from various materials providing the right characteristics for certain rigidity and functionality, e.g., hardened steel of a certain grade or other equivalent materials. By way of example and not limitation, the various shafts and structures of the Stair Climber for Caskets can be made of hardened precision steel material of a certain grade or other equivalent materials.

In an embodiment, a method of transporting and/or maneuvering a Stair Climber for Caskets is provided. In the depicted embodiment, the Stair Climber for Caskets configured with a trolley frame and four sets of wheels arranged and affixed at the four ends of the trolley frame are used for transporting and/or maneuvering a casket. In the depicted embodiment, each set of wheels further comprises three wheels spaced an equal distance from each other that rotate together about a horizontal axis for easy navigation.

By way of example and not limitation, as illustrated above, the Stair Climber for Caskets is uniquely designed and configured with various materials.

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

BRIEF DESCRIPTION OF THE DRAWINGS

Certain embodiments are shown in the drawings. However, it is understood that the present disclosure is not limited to the arrangements and instrumentality shown in the attached drawings.

FIGS. 7 through 9 are various top and side views of an embodiment of a Stair Climber for Caskets.

DETAILED DESCRIPTION OF THE INVENTION

Figure 1:
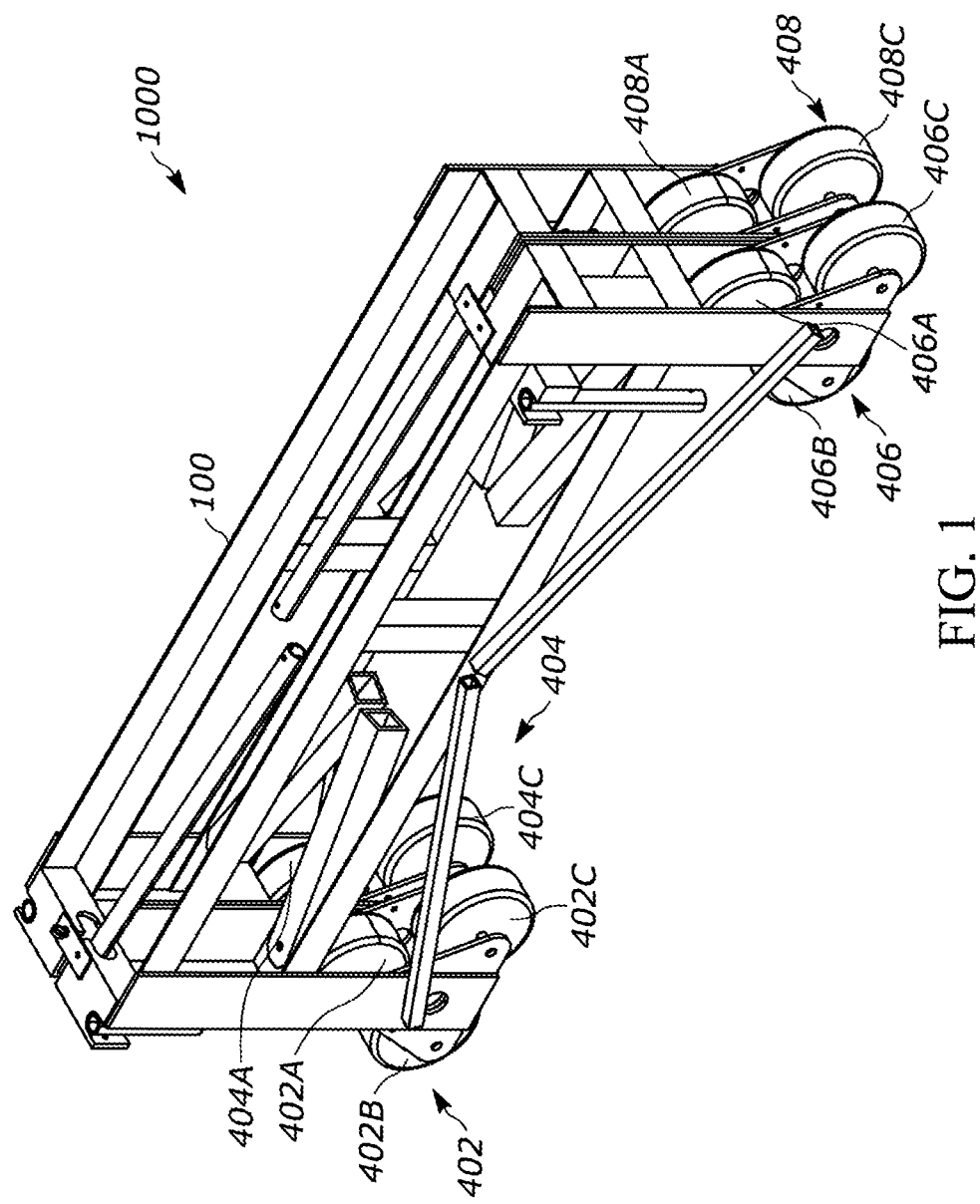
FIG. 1 is a perspective view of an embodiment of a Stair Climber for Caskets with the trolley frame folded.

For the purposes of promoting and understanding the principles disclosed herein, reference is now made to the preferred embodiments illustrated in the drawings, and specific language is used to describe the same.

It is understood that no limitation of the scope of the invention is hereby intended. Such alterations and further modifications in the illustrated device and such further applications of the principles disclosed and illustrated herein are contemplated as would normally occur to one of skill in the art to which this invention relates.

In another embodiment, a Stair Climber for Caskets comprises a trolley frame and four sets of wheels arranged and affixed at the four ends of the trolley frame respectively. The Stair Climber for Caskets is designed ergonomically with the right configuration for ensuring easy movement up and down stairs of different heights and inclinations. The novel Stair Climber is designed and configured to ensure that the total or gross weight of the Stair Climber (weight of the Stair Climber plus load weight of the Casket)—the load never exceeds a certain limit.

In the depicted embodiment, each set of wheels further comprises three wheels spaced an equal distance from each other that rotate together about a horizontal axis for easy navigation. By way of example and not limitation, the Stair Climber for Caskets further comprises wheel plates attached to the set of wheels. In the depicted embodiment, the wheel plates can be manufactured from various materials providing the right characteristics for certain rigidity and functionality, e.g., hardened steel of a certain grade.

FIG. 1 is a perspective view of an embodiment of a Stair Climber for Caskets 100 with the trolley frame folded. In the depicted embodiment, a Stair Climber for Caskets 1000 comprises a trolley frame 100 and four sets of wheels 402, 404, 406 and 408 arranged and affixed at the four ends of the trolley frame 100 respectively.

As illustrated in FIG. 1, in the depicted embodiment, each set of wheels 402, 404, 406 and 408 further comprises three wheels (402a, 402b, 402c, 404a, 404b, 404c, 406a, 406b, 406c, 408a, 408b, 408c and 408d) such that the wheel sets 402, 404, 406 and 408 each include the three wheels spaced an equal distance from each other that rotate together about a horizontal axis for easy navigation. For example, the wheel set 402 comprises 402a, 402b, 402c; the wheel set 404 comprises 404a, 404b, 404c; the wheel set 406 comprises 406a, 406b, 406c; and the wheel set 408 comprises 408a, 408b, 408c. By way of example and not limitation, a rotary bearing is arranged between the wheel sets 402, 404, 406 and 408 and the trolley frame 100 for it to rotate together about a horizontal axis for easy navigation of the Stair Climber for Caskets 1000.

Figure 2:
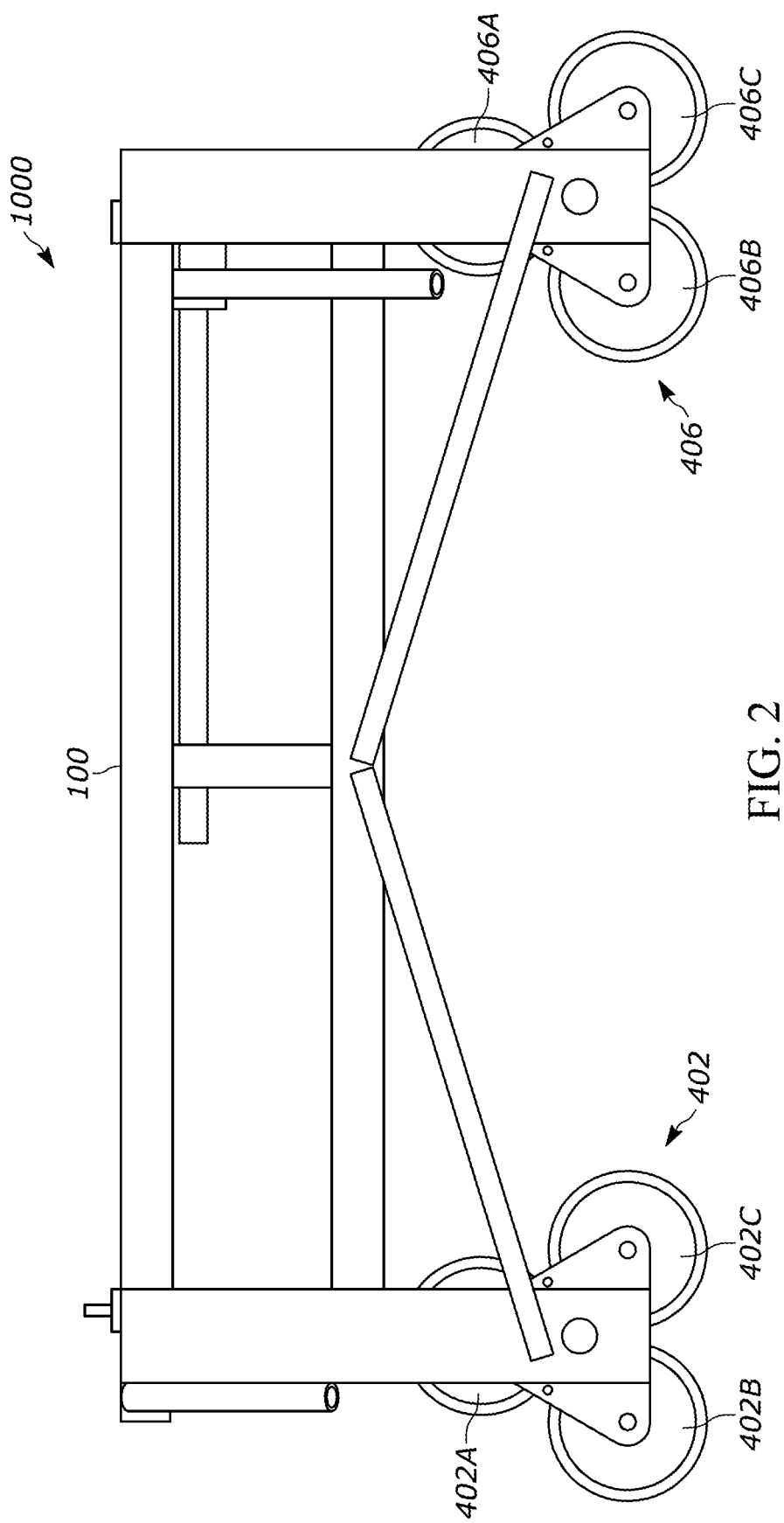
FIG. 2 is a side view of an embodiment of a Stair Climber for Caskets.
Figure 3:
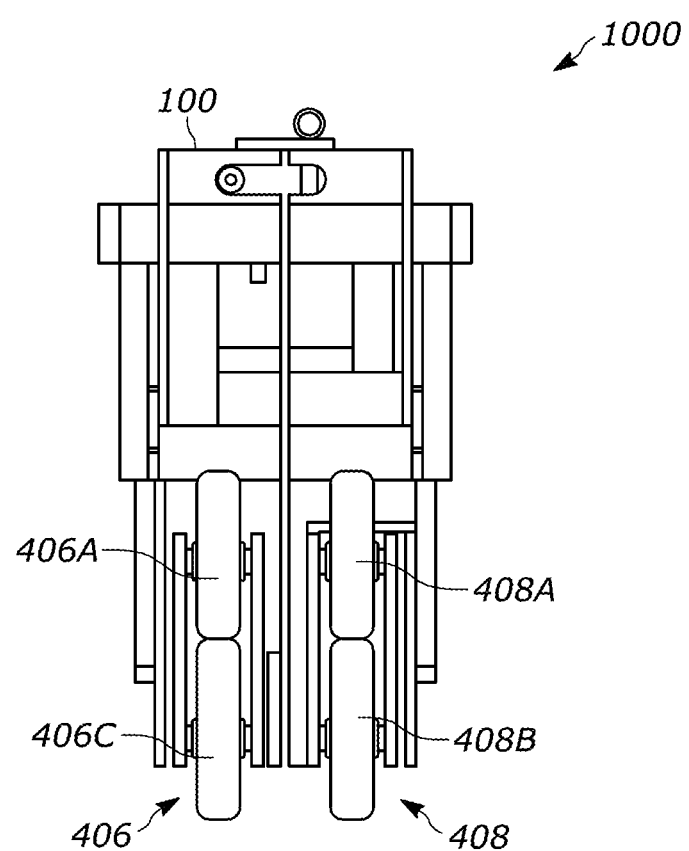
FIG. 3 is a front view of an embodiment of a Stair Climber for Caskets with the trolley frame folded.
Figure 4:
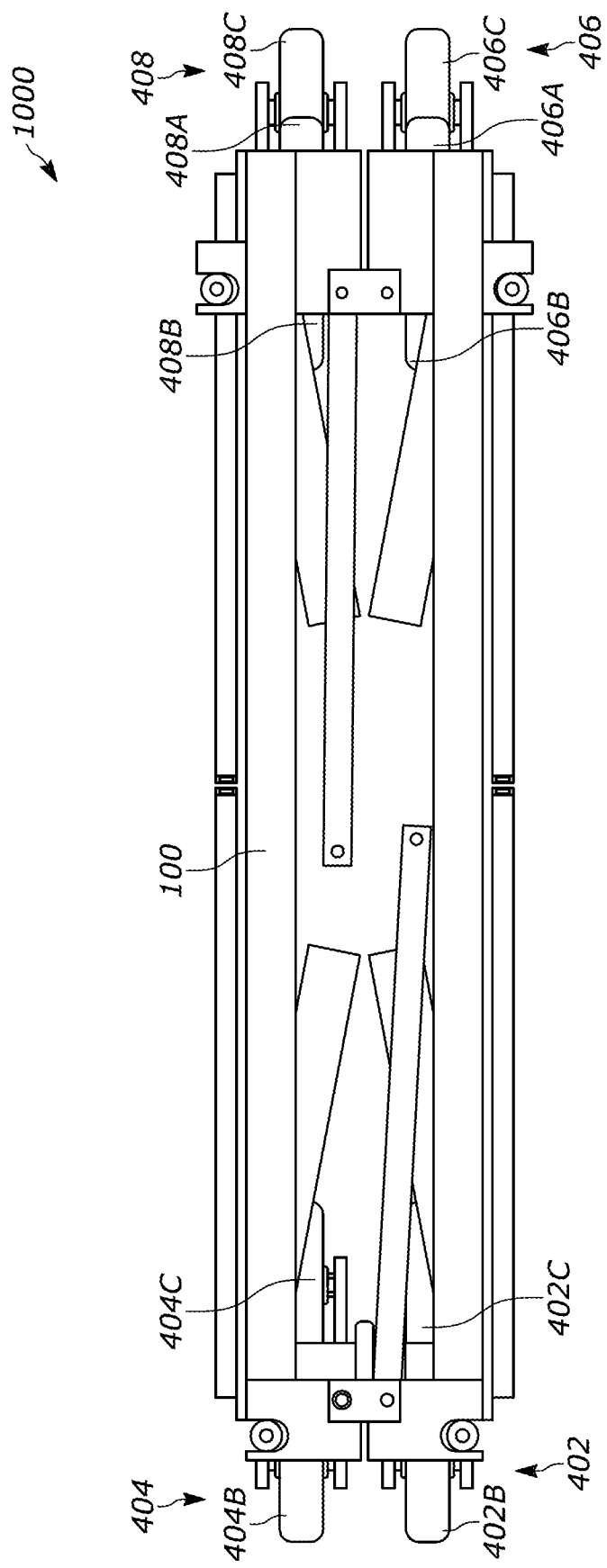
FIG. 4 is a top view of an embodiment of a Stair Climber for Caskets with the trolley frame folded.

FIG. 2 is a side view of an embodiment of a Stair Climber for Caskets 1000. FIG. 3 is a front view of an embodiment of a Stair Climber for Caskets 100 with the trolley frame folded. As illustrated in FIG. 2, in the depicted embodiment, each set of wheels 402, 404, 406 and 408 further comprises three wheels (402a, 402b, 402c, 404a, 404b, 404c, 406a, 406b, 406c, 408a, 408b, 408c and 408d) such that the wheel sets 402, 404, 406 and 408 each include the three wheels spaced an equal distance from each other that rotate together about a horizontal axis for easy navigation.

Figure 5:
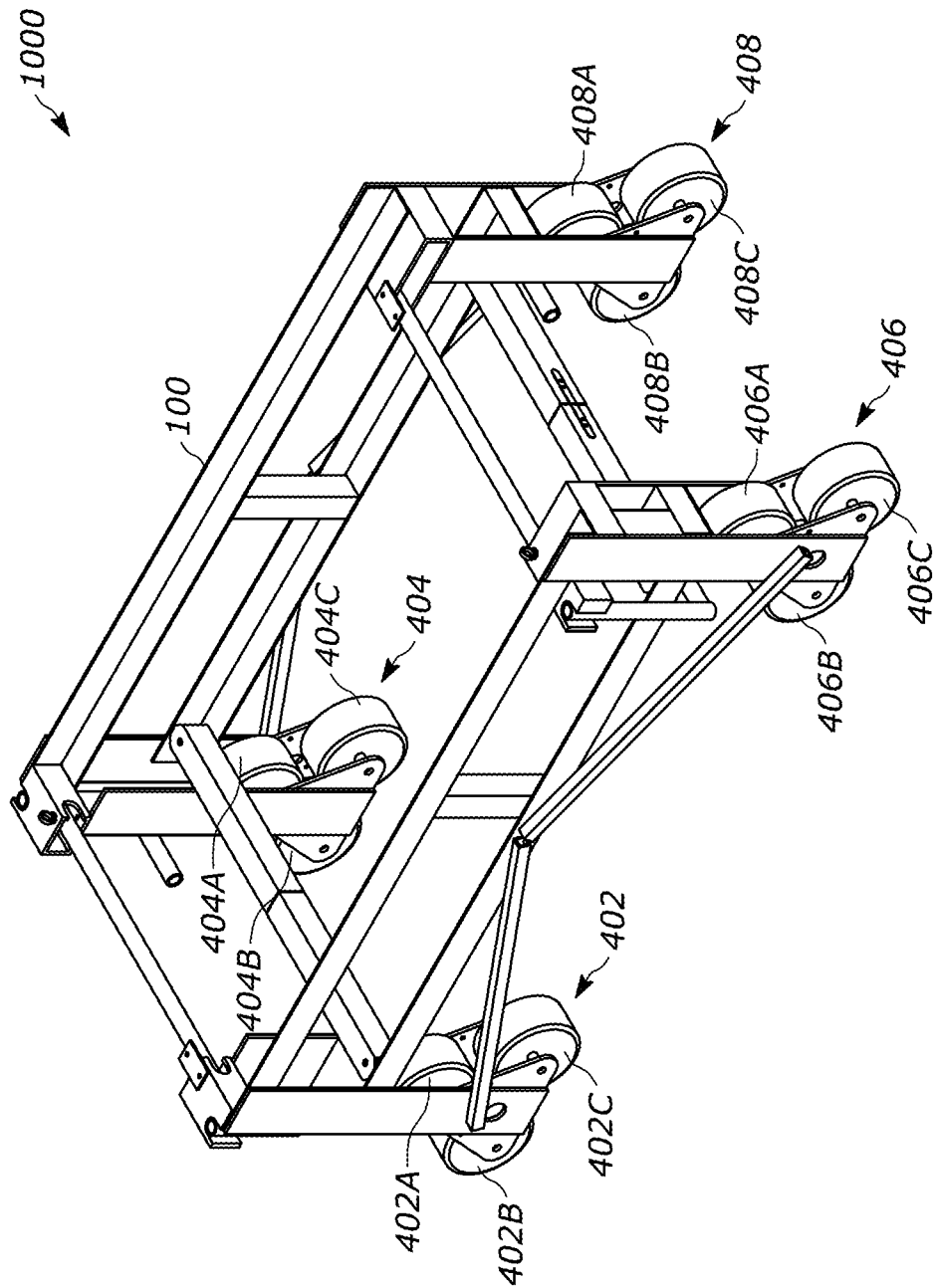
FIG. 5 is a perspective view of an embodiment of a Stair Climber for Caskets with the trolley frame unfolded.
Figure 6:
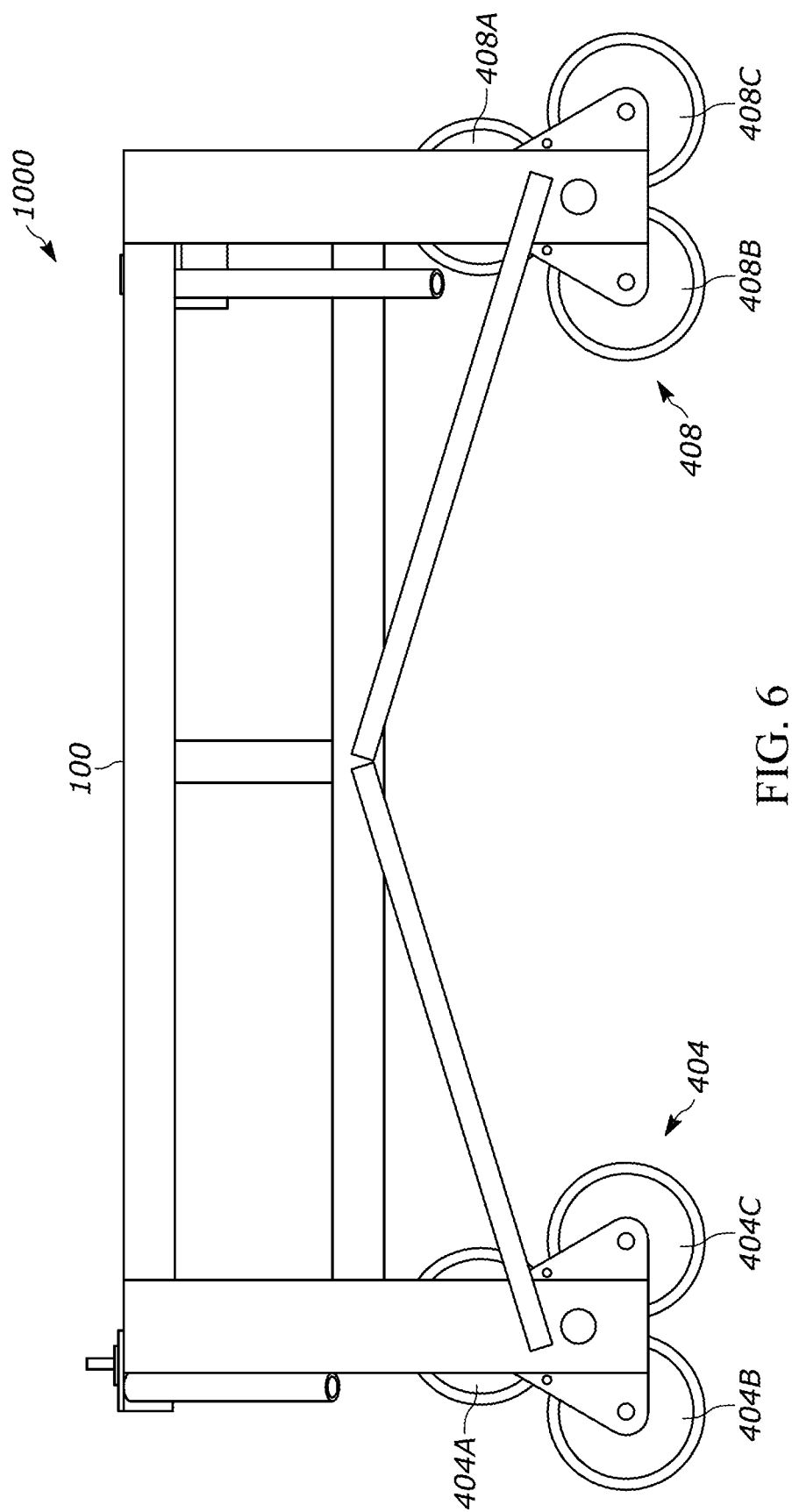
FIG. 6 is a side view of an embodiment of a Stair Climber for Caskets with the trolley frame unfolded.

FIG. 5 is a perspective view of an embodiment of a Stair Climber for Caskets 100 with the trolley frame 200 unfolded. As illustrated, a Stair Climber for Caskets comprises a trolley frame 100 and four sets of wheels 402, 404, 406 and 408 arranged and affixed at the four ends of the trolley frame 100 respectively. In the depicted embodiment, each set of wheels 402, 404, 406 and 408 further comprises three wheels spaced an equal distance from each other that rotate together about a horizontal axis for easy navigation.

By way of example and not limitation, the rotary bearing attached via the triangular shaped wheel plate is arranged between the wheel sets 402, 404, 406 and 408 and the frame 100 for it to rotate together about a horizontal axis for easy navigation and transporting and/or maneuvering a casket 1000.

Figure 7:
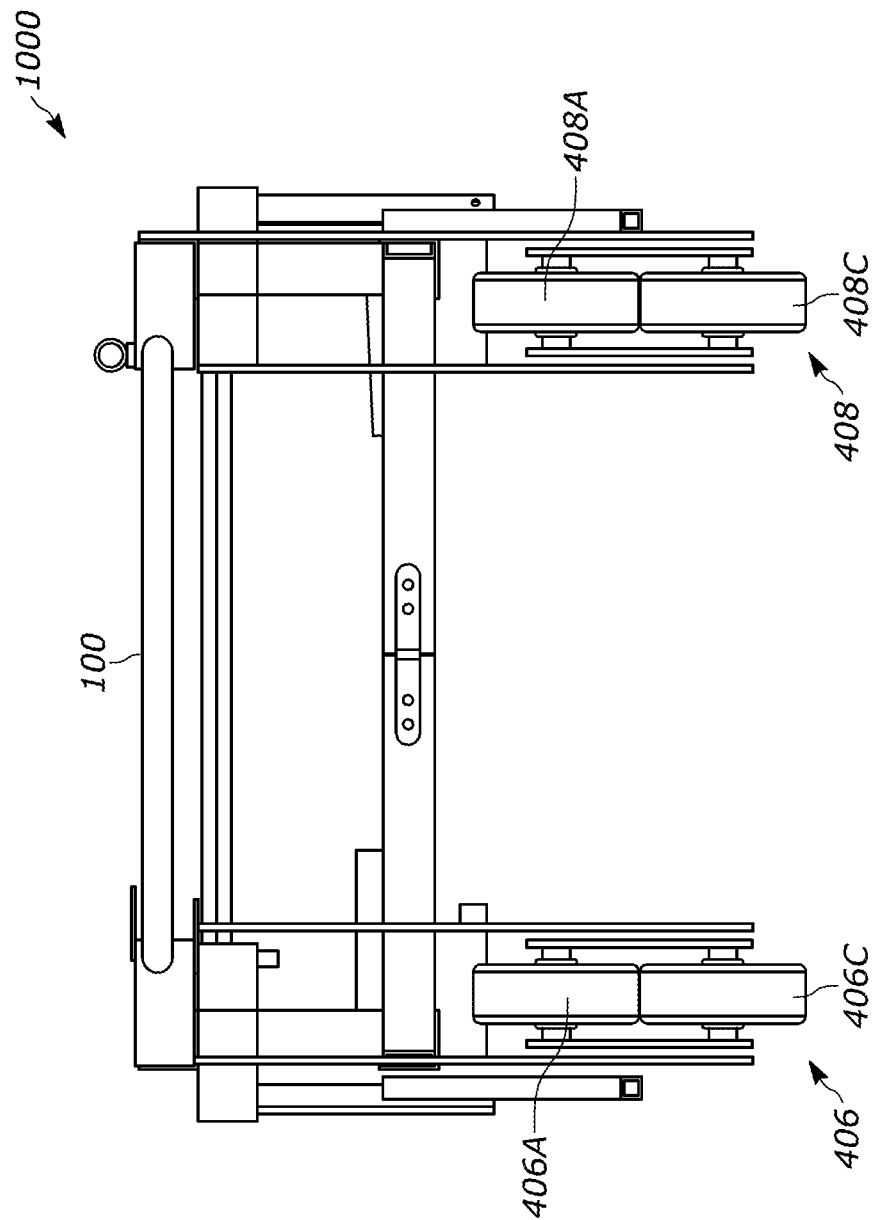
Figure 8:
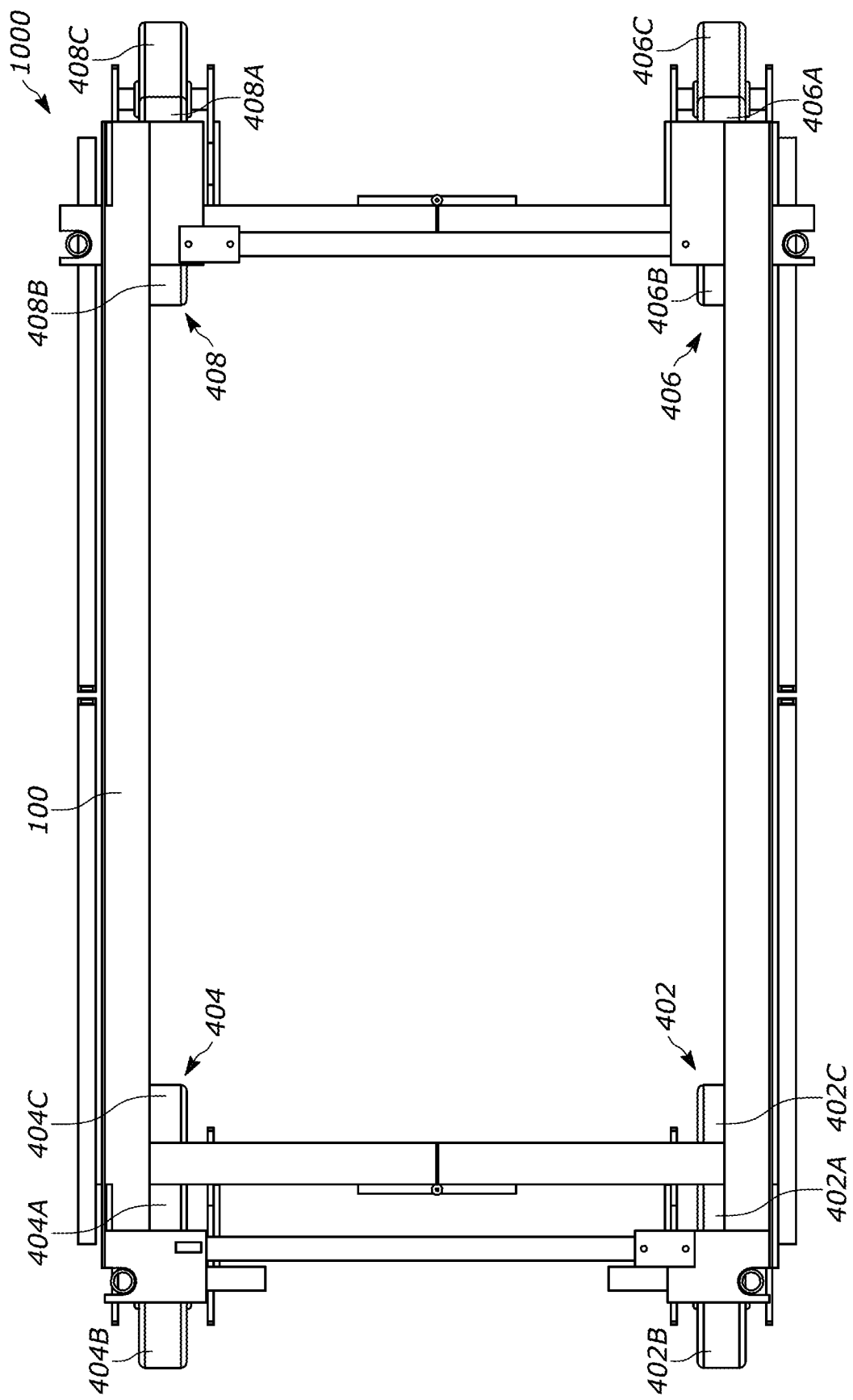
Figure 10:
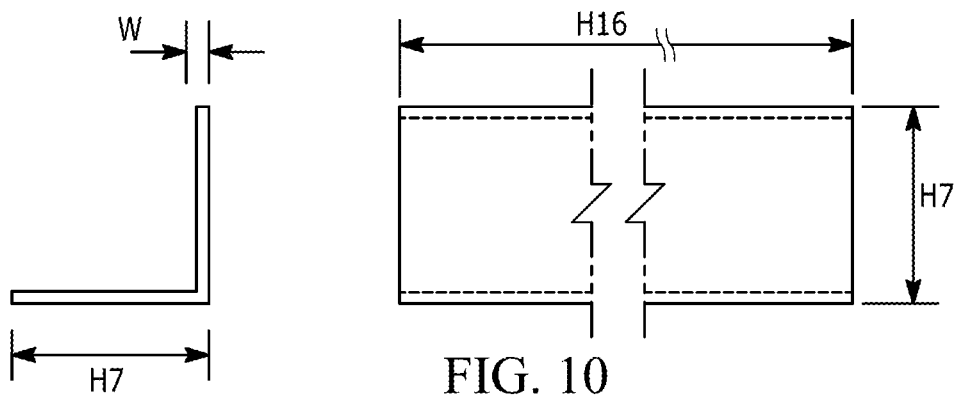
FIGS. 10 and 17 show various views and configuration details of an embodiment of a Stair Climber for Caskets.
Figure 11:
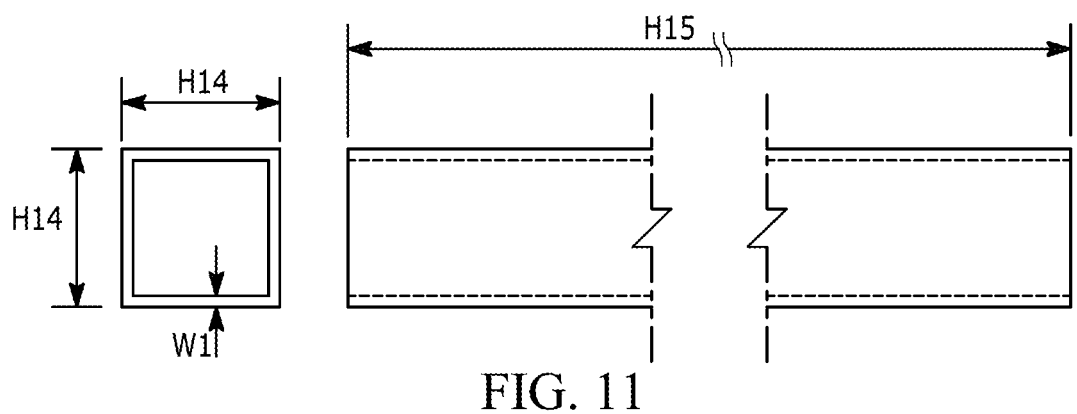
Figure 12:
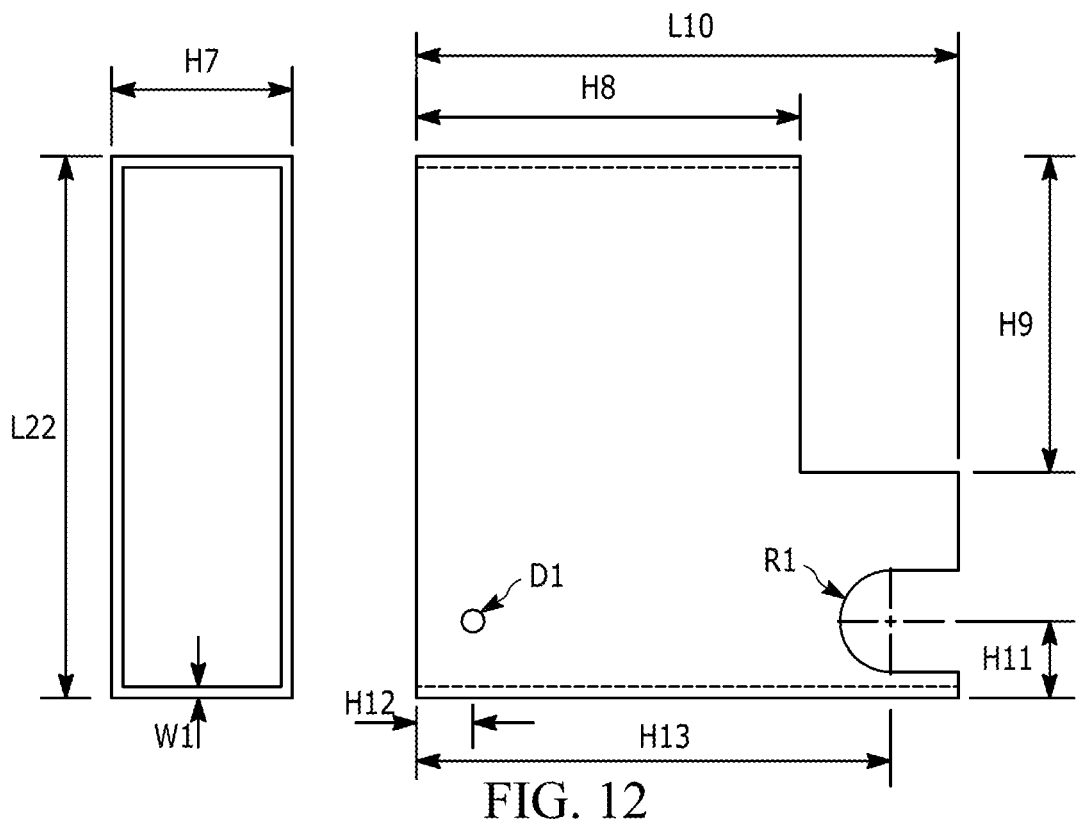
Figure 13:
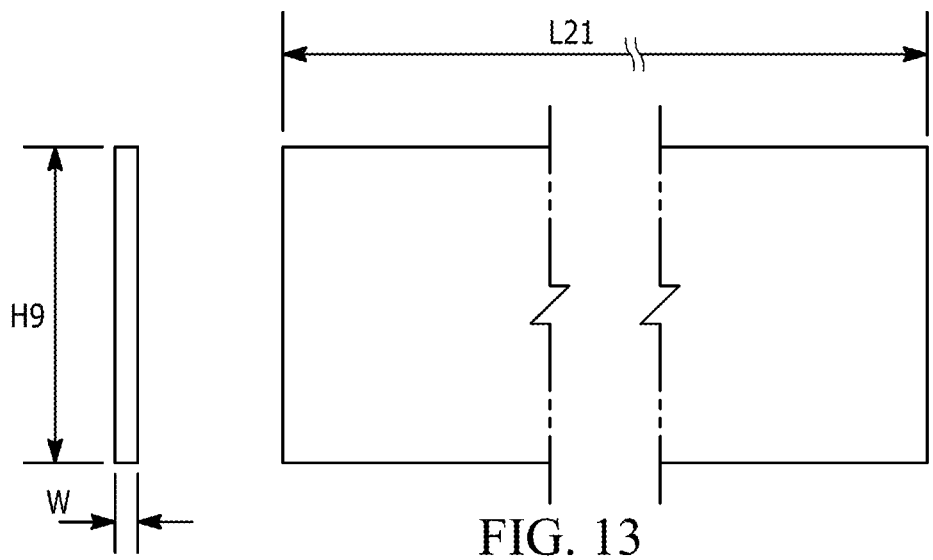
Figure 14:
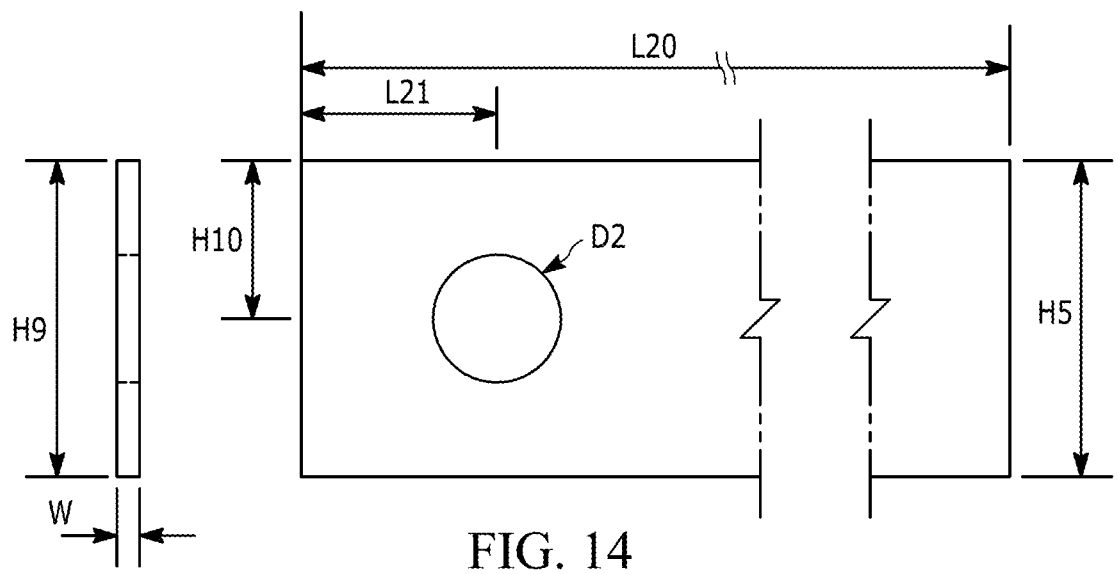
Figure 15:
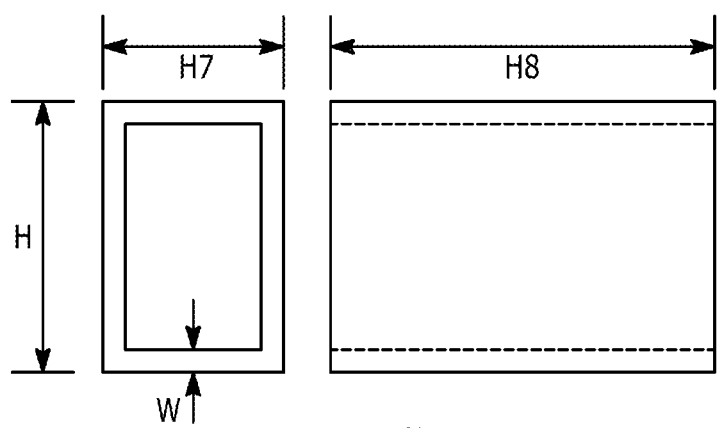

FIGS. 7 through 9 are various views of an embodiment of a Stair Climber for Caskets 100. FIGS. 10 and 15 show various views and configuration details of an embodiment of a Stair Climber for Caskets 1000. FIGS. 16 through 28 show various views and configuration details of the various elements of an embodiment of a Stair Climber for Caskets 1000.

Figure 16:
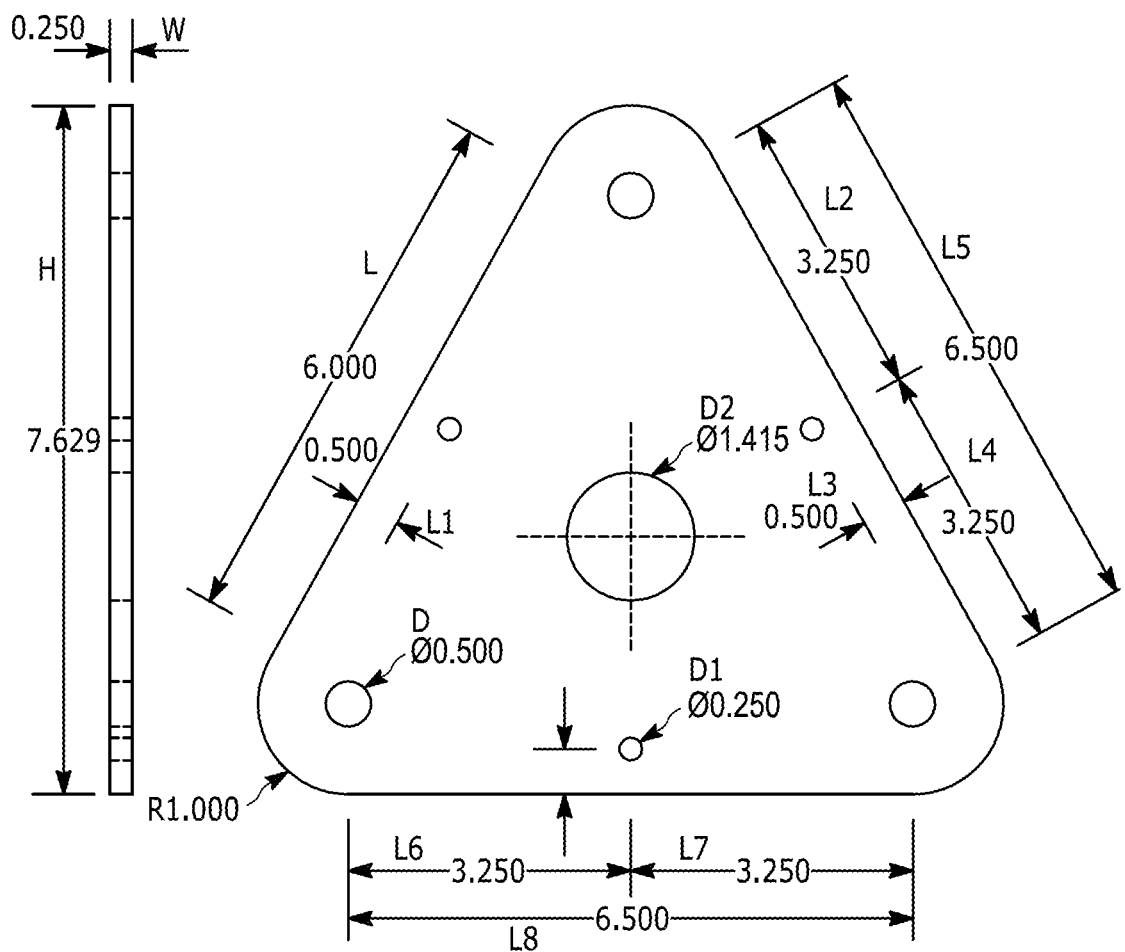
Figure 17:
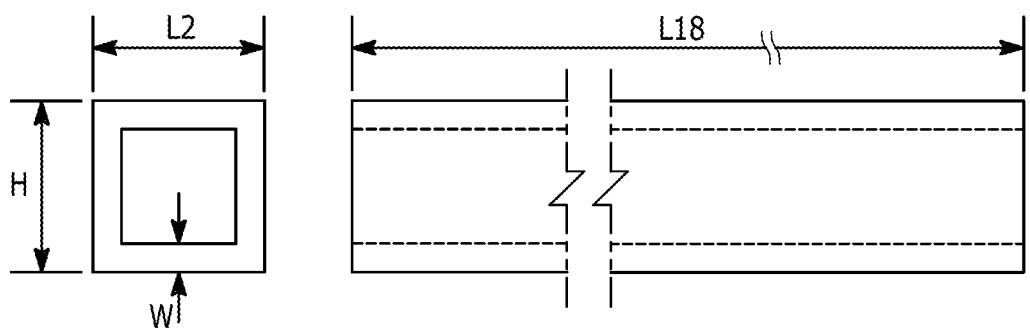
Figure 18:
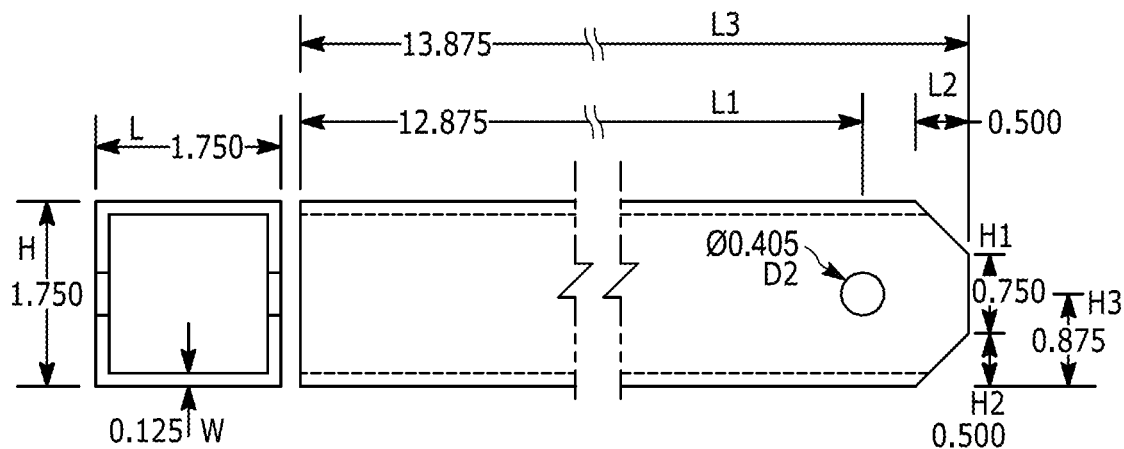
FIGS. 18 through 28 show the preset and preconfigured dimensions for various elements used in an embodiment of a Stair Climber for Caskets.
Figure 19:
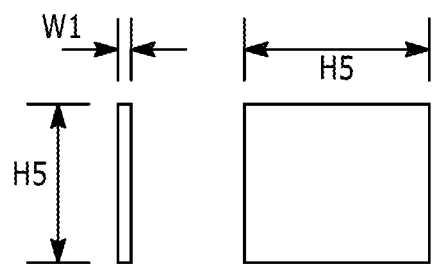
Figure 20:
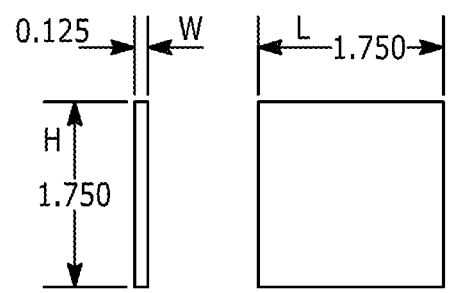
Figure 21:
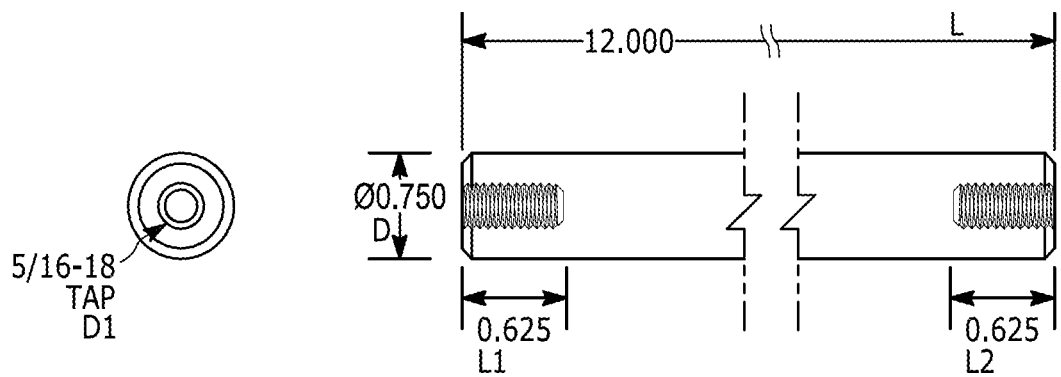
Figure 22:
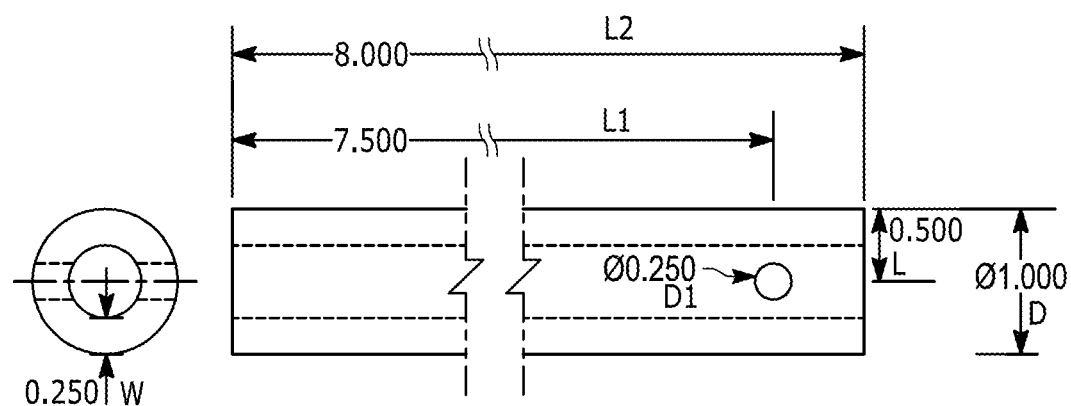
Figure 23:
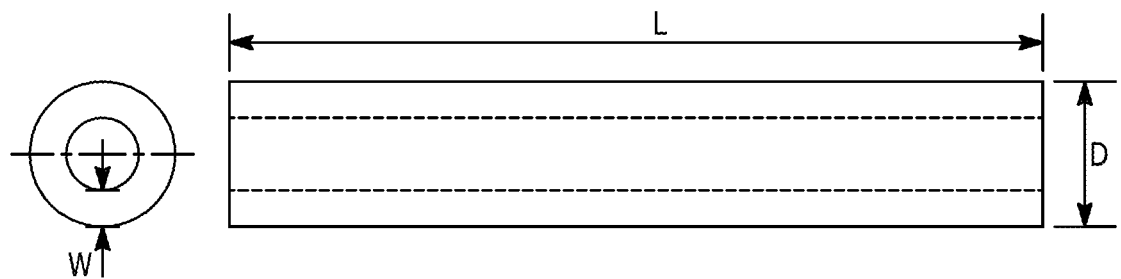
Figure 24:
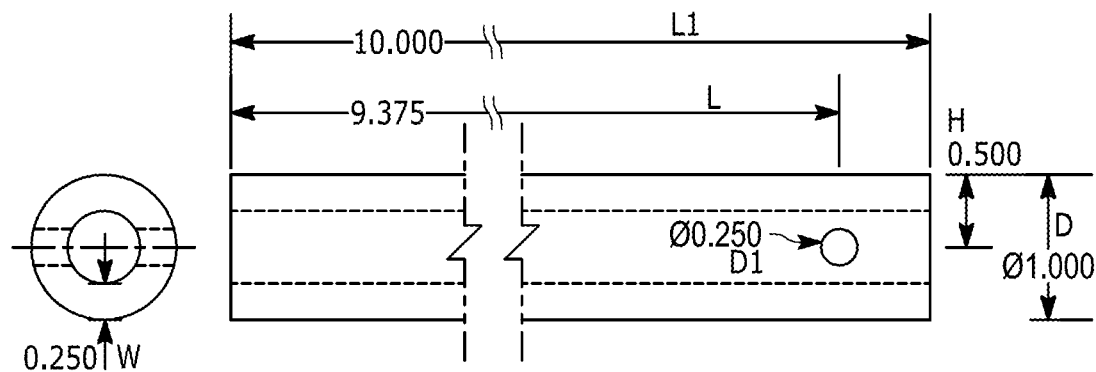
Figure 25:
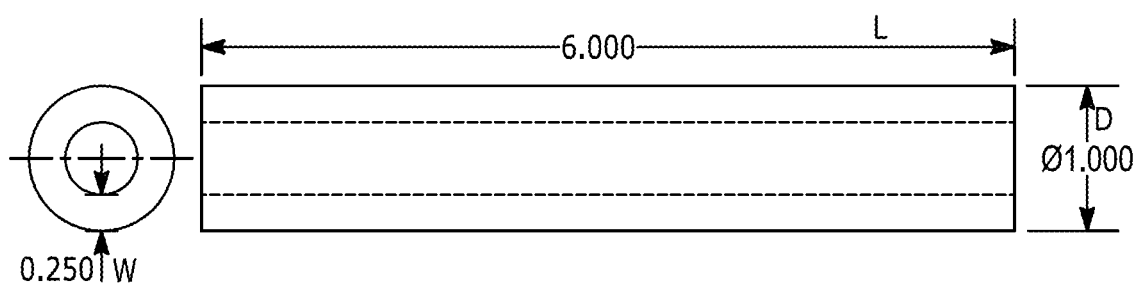
Figure 26:
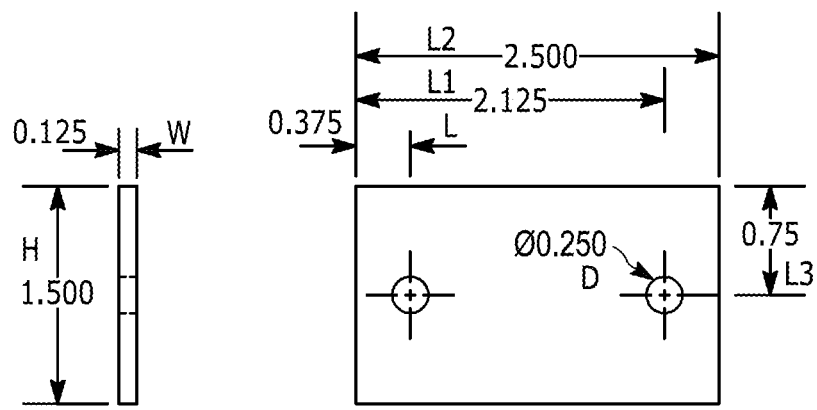
Figure 27:
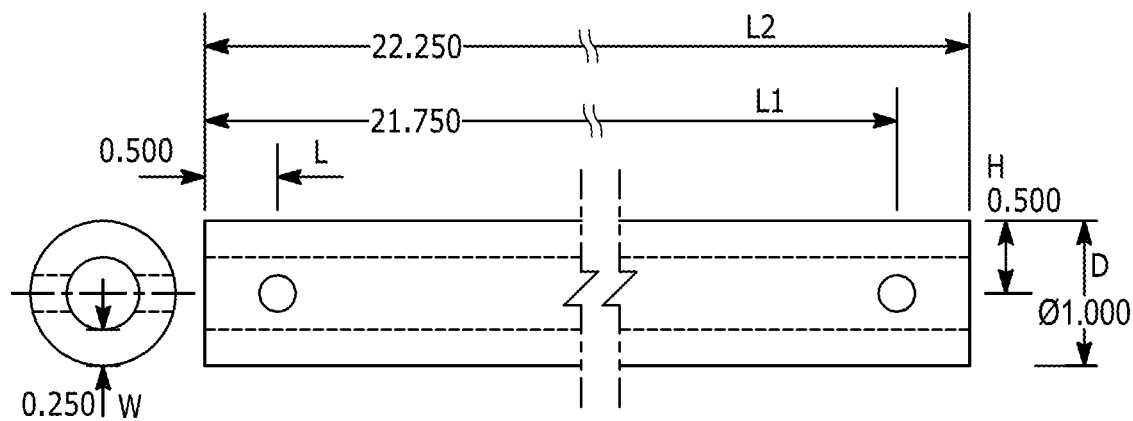
Figure 28:
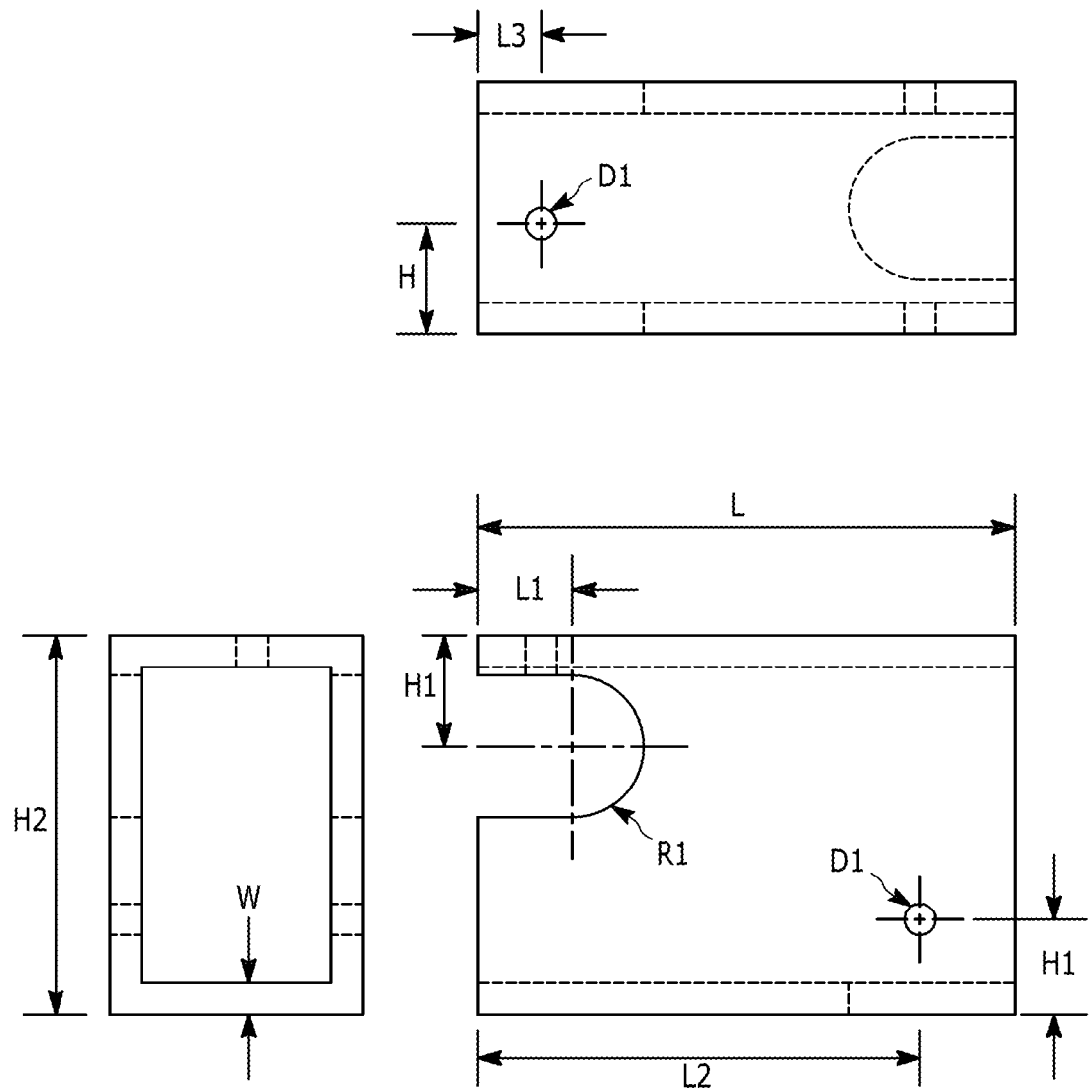

As shown, FIGS. 10 through 15 illustrate the various preset dimensions for elements of the Stair Climber for Caskets. As illustrated in FIGS. 16 and 17, the various preset dimensions of the triangular wheel plate 600 of the Stair Climber for Caskets 1000 is shown. In the depicted embodiment, the triangular wheel plate 600 is configured with each set of wheels 402, 404, 406 and 408 spaced an equal distance from each other such that the wheels are able to rotate together about a horizontal axis for easy navigation of the Stair Climber for Caskets 1000.

As shown in FIGS. 16 and 17, by way of example and not limitation, the wheel set 402 comprises 402a, 402b, 402c; the wheel set 404 comprises 404a, 404b, 404c; the wheel set 406 comprises 406a, 406b, 406c; and the wheel set 408 comprises 408a, 408b, 408c. The wheel sets 402, 404, 406 and 408 and the trolley frame 100 rotate together about a horizontal axis for easy navigating and transporting and/or maneuvering a casket 1000. FIGS. 18 through 28 show the preset and preconfigured dimensions for various elements used in an embodiment of a Stair Climber for Caskets 1000.

It is understood that the preceding is merely a detailed description of some examples and embodiments of the present invention, and that numerous changes to the disclosed embodiments may be made in accordance with the disclosure made herein without departing from the spirit or scope of the invention.

The preceding description, therefore, is not meant to limit the scope of the invention, but to provide sufficient disclosure to allow one of ordinary skill in the art to practice the invention without undue burden. It is further understood that the scope of the present invention fully encompasses other embodiments that may become obvious to those skilled in the art, and that the scope of the present invention is accordingly limited by nothing other than the appended claims.

The invention claimed is:

1. A stair climber for caskets comprising:
    a frame having four ends and four sets of wheels arranged and affixed at the four ends of the frame;
    wherein each set of wheels further comprises a plurality of wheels configured and spaced an equal distance from each other;
    a triangular-shaped wheel plate attached to the set of wheels;
    a rotary bearing attached via a triangular-shaped wheel plate and positioned between the set of wheels and the frame;
    wherein the triangular-shaped wheel plate further includes a plurality of larger apertures and a plurality of smaller apertures positioned at a pre-determined distance offset from the sides of the triangular-shaped wheel plate;
    wherein the plurality of larger apertures and the plurality of smaller apertures are equidistant from each other and from a centrally located aperture; and
    wherein the plurality of wheels rotate together about a horizontal axis for easy maneuvering of a casket up and down the stairs irrespective of the gross weight of the stair climber.

2. The stair climber of claim 1, wherein the frame can be a trolley frame.

3. The stair climber of claim 2, wherein the gross weight of the trolley frame determines the force required to move the casket up and down stairs of different heights and inclinations.

4. The stair climber of claim 1, wherein the plurality of wheels comprises three wheels spaced an equal distance from each other and configured to rotate together about a horizontal axis for easy maneuvering of the stair climber.

5. The stair climber of claim 1, wherein the wheels further comprise a means for transporting a casket up and down stairs of different heights and inclinations.

6. The stair climber of claim 1, wherein the plurality of wheels further comprise folding mechanism configured for transporting a casket up and down stairs of different heights and inclinations.

7. The stair climber of claim 1,
    wherein the wheel sets and the frame are configured to rotate together about a horizontal axis for easy navigating and maneuvering of a casket up and down stairs of different heights and inclinations.

8. The stair climber of claim 1, wherein the stair climber is further configured to move a casket up and down stairs without picking up the entire weight of the casket.

9. The stair climber of claim 1, wherein the load distribution on the stair climber cannot exceed a certain predetermined limit.

10. The stair climber of claim 1, wherein the stair climber and the wheels can be manufactured from hardened precision steel material of a certain grade or other equivalent materials.

11. A method of using a stair climber for caskets, the method comprising the steps of:
    configuring a frame having four sets of wheels arranged and affixed at the four ends of the frame, wherein each set of wheels further comprises a plurality of wheels configured and spaced an equal distance from each other;
    attaching a triangular-shaped wheel plate to the set of wheels;
    rotating a plurality of wheels together about a horizontal axis;
    configuring and attaching a rotary bearing via the triangular-shaped wheel plate:
    positioning the rotary bearing between the set of wheels and the frame;
    wherein the traingular-shaped wheel plate further includes a plurality of larger apertures and a plurality of smaller apertures positioned at a pre-determined distance offset from the sides of the triangular-shaped wheel plate; and
    wherein the plurality of larger apertures and the plurality of smaller apertures are equidistant from each other and from a centrally located aperture; and
    moving of a casket up and down stairs irrespective of the total or gross weight of the stair climber.

12. The method of claim 11, wherein the frame can be a trolley frame.

13. The method of claim 12, wherein the gross weight of the trolley frame determines the force required to move the casket up and down stairs of different heights and inclinations.

14. The method of claim 11, wherein the plurality of wheels comprises three wheels spaced an equal distance from each other and configured to rotate together about a horizontal axis for easy maneuvering of the stair climber.

15. The method of claim 11, wherein the wheels further comprise a means for transporting a casket up and down stairs of different heights and inclinations.

16. The method of claim 11, wherein the plurality of wheels further comprise folding mechanism configured for transporting a casket up and down stairs of different heights and inclinations.

17. The method of claim 11,
wherein the wheel sets and the frame are configured to rotate together about a horizontal axis for easy navigating and maneuvering of a casket up and down stairs of different heights and inclinations.

18. The method of claim 1, wherein the stair climber is further configured to move a casket up and down stairs without picking up the entire weight of the casket.

19. The method of claim 1, wherein the load distribution on the stair climber cannot exceed a certain predetermined limit.

20. The method of claim 1, wherein the stair climber and the wheels can be manufactured from hardened precision steel material of a certain grade or other equivalent materials.

\* \* \* \* \*